US007756000B2

(12) United States Patent
Chester et al.

(10) Patent No.: US 7,756,000 B2
(45) Date of Patent: Jul. 13, 2010

(54) SPREAD BASEBAND INJECTED PILOT CARRIER

(75) Inventors: David B. Chester, Palm Bay, FL (US); David H. Damerow, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 452 days.

(21) Appl. No.: 11/749,914

(22) Filed: May 17, 2007

(65) Prior Publication Data

US 2008/0285595 A1 Nov. 20, 2008

(51) Int. Cl.
*H04J 13/02* (2006.01)
(52) U.S. Cl. .................. 370/203; 375/141
(58) Field of Classification Search .......... 370/503, 370/203; 375/141, 267, 295, 150; 348/473
See application file for complete search history.

(56) References Cited

U.S. PATENT DOCUMENTS

| 5,724,383 | A  | * | 3/1998 | Gold et al. ............ 375/141 |
| 6,246,439 | B1 | * | 6/2001 | Zink et al. ............ 348/473 |
| 6,606,357 | B1 |   | 8/2003 | Cobb et al. ........... 375/281 |
| 2003/0161411 | A1 | * | 8/2003 | McCorkle et al. ...... 375/295 |
| 2004/0062298 | A1 | * | 4/2004 | McDonough et al. .... 375/150 |
| 2006/0285604 | A1 | * | 12/2006 | Walton et al. .......... 375/267 |
| 2007/0211142 | A1 |   | 9/2007 | Boritzki et al. ........ 348/21 |
| 2007/0211805 | A1 |   | 9/2007 | Boritzki et al. ........ 375/259 |
| 2008/0225689 | A1 | * | 9/2008 | Bickerstaff et al. .... 370/208 |

FOREIGN PATENT DOCUMENTS

GB 2 313 985 12/1997

OTHER PUBLICATIONS

Newton's Telecom Dictionary, 9th Edition, Sep. 1995, Flatiron Publishing, pp. 1 and 504, definition of "Forward Error Correction."*

\* cited by examiner

*Primary Examiner*—Melvin Marcelo
(74) *Attorney, Agent, or Firm*—Allen, Dyer, Doppelt, Milbrath & Gilchrist, P.A.

(57) ABSTRACT

A system for communicating includes a transmitter that has an encoder and baseband modulator that encodes and modulates a sequence of data symbols as a payload data constellation to be communicated. A PN sequence generator and baseband modulator form a pilot signal as a training sequence with a periodically repeating spread spectrum sequence. A circuit superimposes the pilot signal over the sequence of data symbols to form a composite communication signal that is transmitted. A receiver receives the composite communication signal and extracts the pilot signal from the composite communication signal.

27 Claims, 4 Drawing Sheets

SPREAD BASEBAND INJECTED PILOT CARRIER

FIELD OF THE INVENTION

The present invention relates to communication systems, and more particularly, the present invention relates to pilot carriers used in communication systems.

BACKGROUND OF THE INVENTION

Baseband injected pilot carriers are often used in communication systems to enhance the performance of required operations in a high performance modem. An example of such system is disclosed in commonly assigned U.S. Pat. No. 6,606,357, the disclosure which is hereby incorporated by reference in its entirety. The '357 patent discloses a QPSK modulation scheme that uses a data spreading mechanism to take a relatively limited portion of the available transmitter power and inject into the QPSK waveform a prescribed amount of carrier signal power. Detection and non-regenerative extraction of the carrier at the receiver can be achieved without incurring a signal-to-noise degradation penalty. This injected, carrier based modulation scheme can use high performance, forward error correction (FEC) coding to reduce the signal power required for achieving a low energy per bit-to-noise density ratio ($E_b/N_o$) on the order of 1 to about 0 dB.

The price paid for this type of improvement in tracking performance is either (1) added bandwidth when a non-constellation symbol is used, or (2) a reduced throughput when the baseband pilot injected carrier (BPIC) symbols are part of the data constellation and are time multiplexed with payload data. It is preferred, however, to have a baseband injected pilot carrier based system that provides performance enhancements, without increasing bandwidth or decreasing the payload throughput.

SUMMARY OF THE INVENTION

A system for communicating includes a transmitter that has an encoder and baseband modulator that encodes and modulates a sequence of data symbols as a payload data constellation to be communicated. A PN sequence generator and baseband modulator form a pilot signal as a training sequence with a periodically repeating spread spectrum sequence. A circuit superimposes the pilot signal over the sequence of data symbols to form a composite communication signal that is transmitted. A receiver receives the composite communication signal and extracts the pilot signal from the composite communication signal.

In one non-limiting aspect, a circuit processes the pilot signal as a variation of the payload data constellation. This pilot signal can be formed as one of at least a subset of constellation symbols, a different constellation, a different waveform, different symbol rates, and offset phase, time and frequency versions of the payload data constellation. The pilot signal can also be formed as predefined auto correlation and cross-correlation properties.

The pilot carrier is used to track the carrier phase and frequency. The modulated pilot is de-spread to improve the SNR for carrier tracking. As is evident to those skilled in the art, this is done using known direct sequence spread spectrum tracking techniques. This tracking does not suffer from the squaring or quadrupling tracking losses of a typical carrier tracking loop because the modulating sequence is known and can be removed prior to the phase detection. As a result, the carrier can be tracked at much lower SNR or with a wider loop bandwidth than with a conventional tracking loop. This invention is thus ideally suited to turbo forward error correction coded systems, where the Eb/No can be less than 2 dB.

In one non-limiting example, the system offers an advantage over existing carrier recovery loop techniques in that the correlation tracking loop, as in direct sequence PN tracking systems, can also provide timing. If the pilot carrier is at the same symbol rate and is synchronous with the payload modulation, the recovered pilot timing can be used directly. The pilot carrier can also be used in simplifying or enhancing the performance of an automatic gain control loop.

The pilot sequence and modulation is known, therefore the received phase can be unambiguously resolved. This eliminated the need for differential encoding/decoding, which increases the BER. Further the correlation vectors for the pilot carrier at time offsets can provide an estimate of the communications channel characteristics. This enables initialization and periodic update of an adaptive equalizer where it may be difficult for the equalizer to converge on payload data alone either due to a very dispersive channel or a dispersive channel combined with a low Eb/No and a high symbol error rate.

The pilot sequence can be any sequence with the desired autocorrelation/cross-correlation properties. The sequence length and phase can be such that it matches FEC code blocks or de-interleaver timing so that once recovered, the pilot sequence will provide timing reference for these functions. This eliminates the requirement of and overhead associated with insertion of a special synchronization word into the data sequence for this purpose.

The system and method, in accordance with non-limiting examples of the present invention, allows much of the tracking loop functionality to be implemented at the lower output rate of the correlation tracking loop, offering advantages in power, precision, programmability, and stability.

Because the pilot symbol sequence is known, pilot symbols can be subtracted before making payload symbol decisions to remove the known "noise" source from the decision. This is implemented by subtracting the pilot symbol from the soft decisions before the decision is made or the decision threshold can be shifted based on the pilot symbol value.

Some advantages of the system and method as described over existing techniques are:

a) time tracking using pilot symbol correlation to replace or assist the conventional time tracking;

b) if the payload and pilot modulations have the same spectrum, the composite spectrum will look like a payload spectrum without the pilot, i.e. there is no bandwidth expansion and the composite spectrum will meet the same spectral mask (unlike the original BIPC);

c) channel estimation through pilot correlation results at different time offsets; and d) time alignment of baseband processing functions such as decoding or deinterleaving by aligning the pilot sequence length and timing to the baseband process timing.

In another aspect, a conditioning circuit conditions the pilot signal by one of at least pulse shaping, filtering, sample rate conversion and frequency translation. The encoder preferably is formed as a convolutional forward error correction (FEC) encoder. A baseband modulator for the sequence of data symbols is preferably formed as a Phase Shift Keying (PSK) modulator.

A PN sequence generator at the receiver can generate an undistorted version of the pilot signal generated at the transmitter. A circuit can extract the processing parameters used in demodulating the payload data. These processing parameters can be formed of at least one of timing offset, timing drift, frequency offset, frequency offset drift, phase offset, and multipath channel characteristics.

An apparatus and method is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

In accordance with a non-limiting example of the present invention, a pilot carrier is formed and injected as a periodically repeating spread spectrum sequence. It has a desired auto-correlation and cross-correlation and is superimposed at a low power level over the data sequence. The power level is chosen such that the composite transmitted signal meets the spectral mask requirements of the system, while the power level and processing gain of the sequence enable the required performance enhancements. This PN sequence can be implemented as a number of variations of the payload data constellation such as (1) a subset of constellation symbols; (2) a different constellation; (3) a different waveform; (4) different symbol rates; and (5) offset phase, time and frequency versions of the constellation.

Figure 1:
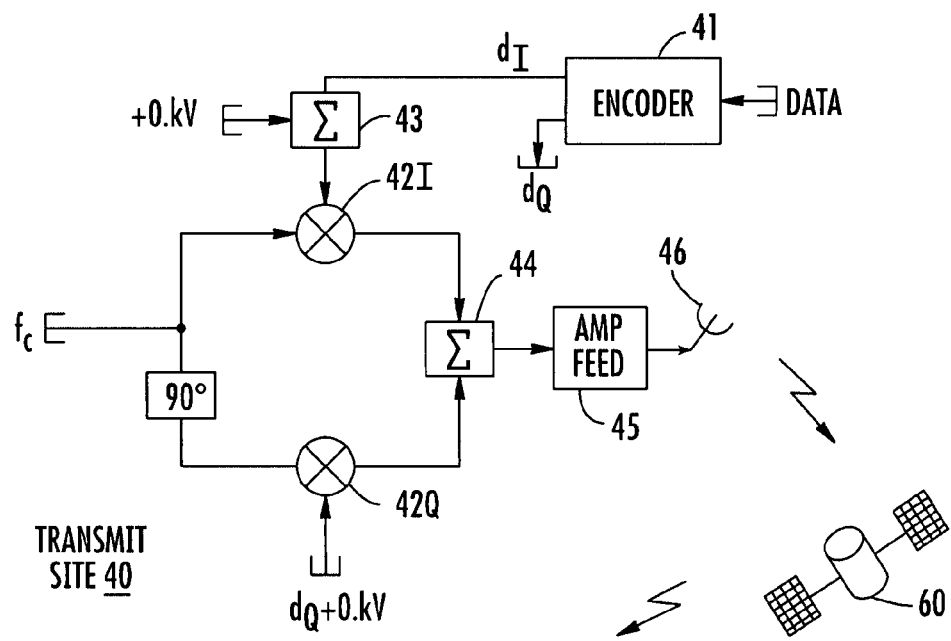
FIG. 1 is a prior art block diagram illustrating a QPSK-based satellite communication system that uses a carrier-injecting modulation scheme as disclosed in the above-identified '357 patent.
Figure 1:
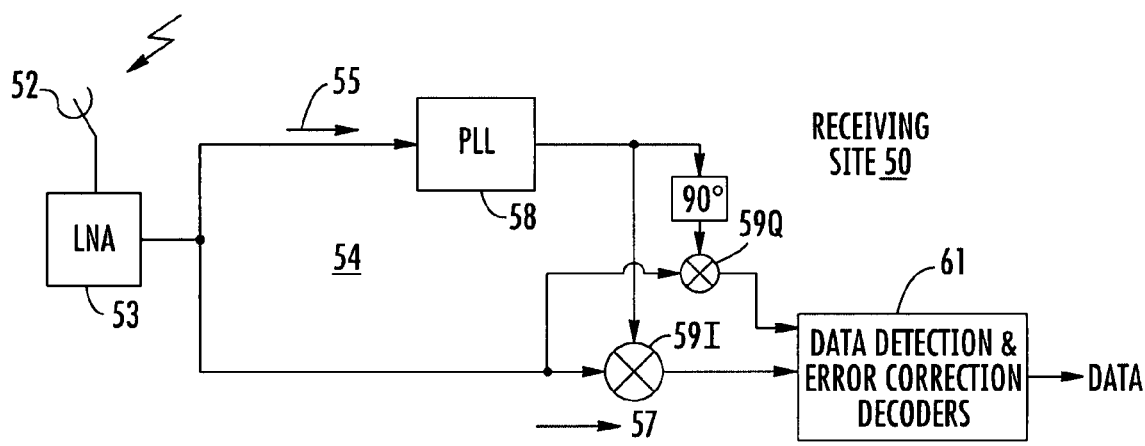
Figure 2:
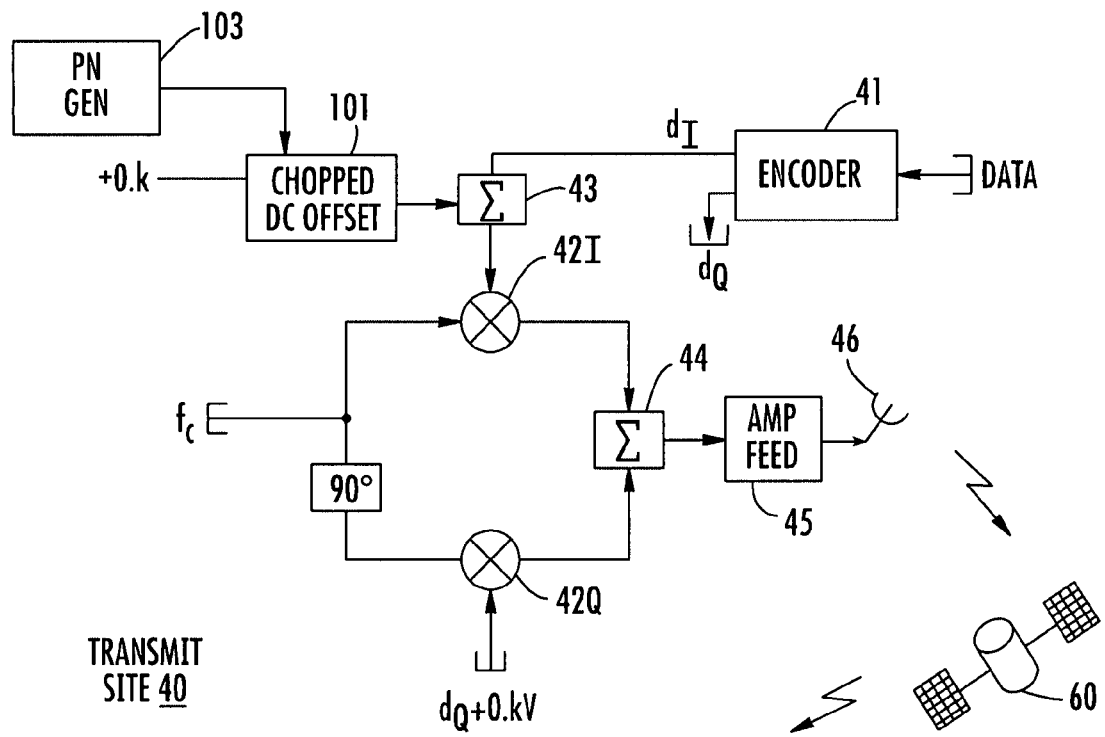
FIGS. 2 and 3 are block diagrams that illustrate a prior art QPSK-based satellite communication system having a spread carrier-injecting modulation and demodulation scheme in accordance with another embodiment described in the above-identified '357 patent.
Figure 2:
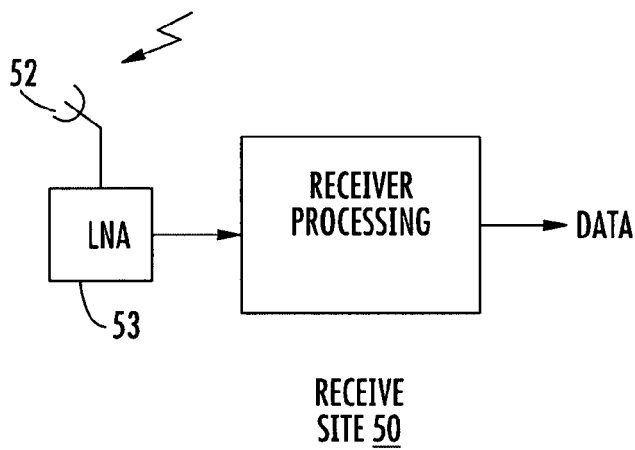
Figure 3:
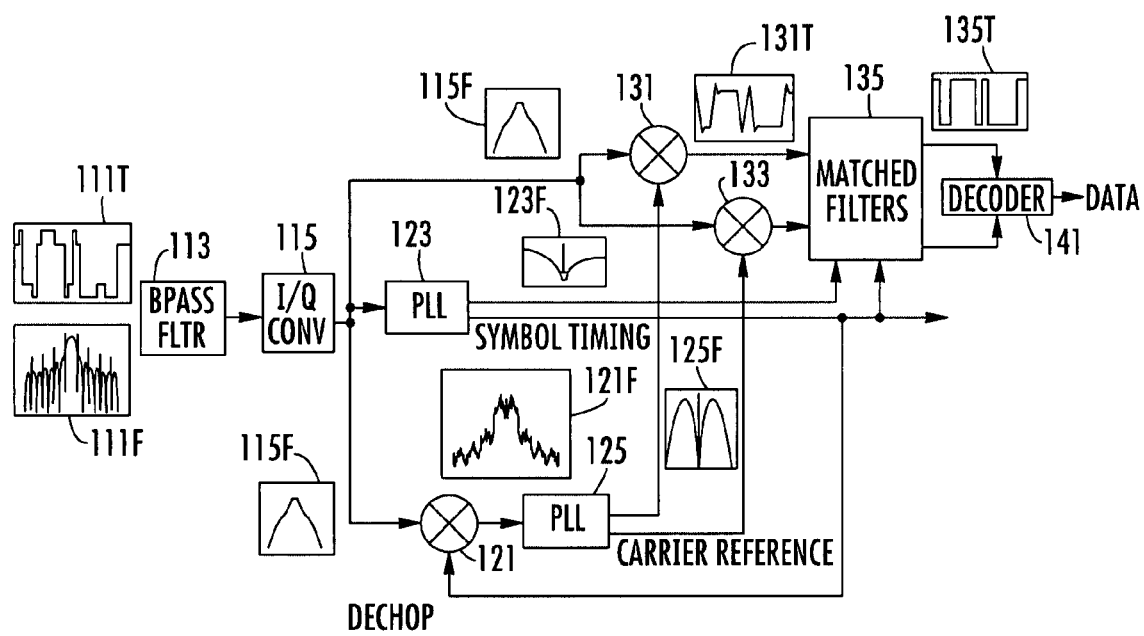
Figure 4:
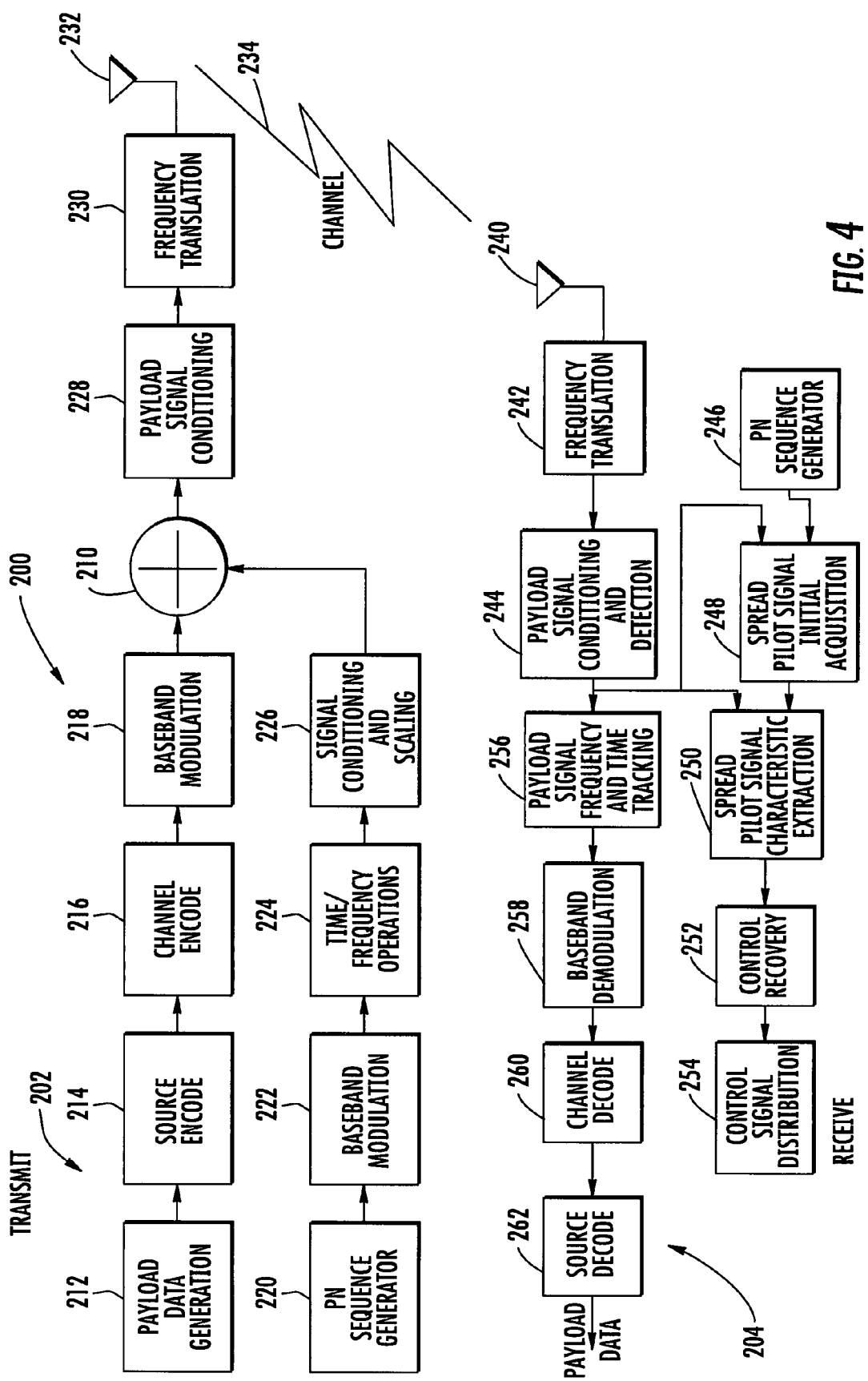
FIG. 4 is a block diagram of the communication system that uses a spread, baseband injected pilot carrier system in accordance with a non-limiting example of the present invention.

For purposes of description and background, the prior art techniques relative to a QPSK modulation scheme disclosed in the above-identified '357 patent are described relative to FIGS. 1-3 followed by a detailed description of the spread baseband injected pilot carrier system relative to FIG. 4.

As shown in FIG. 1, the conventional QPSK modulation process injects into a resultant QPSK waveform a prescribed amount of carrier energy, which serves to facilitate detection and recovery (rather than non-linear regeneration) of the carrier at the receiver. That injected carrier-based modulation scheme may exploit high performance forward error correction (FEC) coding schemes to reduce significantly the signal power required for achieving a desired bit error probability.

FIG. 1 diagrammatically illustrates the prior art QPSK-based satellite communication system that uses a carrier-injecting modulation scheme such as described in greater detail in the commonly assigned and incorporated by reference '357 patent. Respective earth stations 40 and 50 are linked by a satellite transponder 60. Earth station 40 corresponds to a transmit site and earth station 50 corresponds to a receive site.

At the transmit site 40, in-phase (I) channel and quadrature-phase (Q) channel data symbols $d_I$ and $d_Q$ are encoded in an encoder 41 with a prescribed forward error correction code, such as a high performance code (e.g., a turbo, as a non-limiting example), and coupled to associated mixers 42I and 42Q, to which a carrier signal $f_c$ is also applied. The encoded data symbol streams are typically defined as excursions between prescribed voltage levels as respective normalized values of +1.0 volts and −1.0 volts. In addition, the data signal path of one of the channels is summed with a prescribed D.C. voltage level to provide an offset from the ideal normalized value.

A summing unit 43 is installed in the in-phase data signal path to which a voltage offset of +0.k volts is applied. The insertion of this DC offset voltage shifts or biases the reference levels for the encoded in-phase data symbol stream to values of 1.k volts and (−1.0+0.k volts). The resultant phase quadrature modulated signals produced by mixers 42I and 42Q are then summed in a summing unit 44 to produce a composite QPSK signal, which is transmitted via amplifier-feed circuitry 45 coupled to an antenna 46.

At the receive site 50, signals received by an antenna 52 and associated low noise amplifier circuitry 53 are coupled to a single demodulator loop, which is shown at 58 as a phase locked loop. To demodulate the data, the received signal is coupled to a carrier recovery path 55 and a data recovery path 57. Since a prescribed amount of discrete carrier energy is contained in the transmitted QPSK waveform, that carrier may be readily extracted by a phase locked loop 58, without the need for an upstream signal to noise degrading nonlinear carrier regenerator circuit. The data recovery path 55 includes a pair of phase detectors 59I/Q, to which the received I/Q channel data plus carrier and the extracted carrier signals are supplied. The output of the phase detector 59I/Q represents the encoded data symbols, which are detected using matched filters and are applied to data detection and error correction recovery circuitry 61 to recover the original data.

FIGS. 2 and 3 show a "spread" carrier, that is functionally equivalent to that achieved by the direct insertion of a DC offset or bias voltage, which is injected into the QPSK waveform, by replacing the fixed DC offset voltage feed to the summing unit 43 with a chopped or spread DC offset 101, which is produced by controllably gating a +0.k volt offset to the summing unit by means of a "randomizing" or "spreading" square wave pattern, such as one supplied by a pseudorandom noise (PN) generator 103.

To facilitate PN timing recovery in the demodulator, the PN sequence may be relatively short. Manchester or bi-phase coding of the PN sequence, i.e., multiplying the sequence values by an alternate +1/−1 volt signal, guarantees a transition at each mid-symbol. This, in turn, ensures that the carrier and data signals are time-orthogonal. As a consequence, the carrier does not interfere with the data signal except for the small power loss described above. The data bits do not produce phase jitter in the carrier recovery loop.

Because the loss incurred with QPSK is caused by a difference in level between a "1" and a "0," the difference can be made to average to zero over a symbol time by chopping the transmitted carrier with a square wave having values +1 and −1. If the carrier is chopped at the symbol rate, with an edge occurring at mid-bit, for example, the signal level will be averaged within the demodulator matched filter and no degradation will result. This restores the QPSK loss to be the same as for BPSK.

As shown in the demodulator diagram of FIG. 3, recovering the chopped or spread carrier requires a slightly more complex demodulator, since the carrier must be de-chopped or de-spread in order to be recovered. Since the spreading operation is synchronous with symbol timing, however, the same circuitry may be used for both. Just as transmitting a carrier results in simpler carrier recovery hardware, spreading the carrier can result in simpler symbol timing recovery hardware. Time (T) and frequency (F) domain waveforms are shown at various points in the demodulator diagram of FIG. 3.

The received signal shown at 111T and 111F is filtered in a bandpass filter 113, and downconverted to a complex baseband signal in an I/Q downconverter 115, which may comprise quadrature mixer, and A/D converter. The complex baseband signal shown at 115F is coupled to a despreading mixer 121, to which a despreading PN waveform is supplied by a phase locked loop 123, tuned to the symbol rate, so as to produce the carrier signal spectrum 121F. This carrier is filtered using a phase lock loop 125, which provides a coherent carrier reference 125F to each of in-phase channel and quadrature-phase channel mixers 131 and 133, to which the complex baseband signal 115F is applied.

The outputs of the mixers 131 and 133, one of which is shown at 131T, are filtered in a pair of matched filters 135 for optimum detection, as in a conventional demodulator. As a non-limiting example, the matched filter outputs may be quantized to three or more bits to provide a better decoder performance. Optimum performance of the decoder requires accurate quantized decision levels. The use of a coherent automatic gain control (AGC) circuit 53, i.e., AGC-derived from the reference carrier, provides an accurate AGC and hence quantization levels because of the relatively high signal-to-noise ratio realized by eliminating the non-linear carrier recovery circuit.

Symbol timing for the matched filters 135 shown at 123F is derived by filtering the data component of the chopped spectrum using the phase locked loop 123. The recovered data samples shown at 135T and the symbol clock 123F are coupled to a downstream decoder 141.

Referring now to FIG. 4, a detailed description follows of the spread baseband injected pilot carrier system in accordance with a non-limiting example of the present invention.

The pilot carrier is a periodically repeating spread spectrum sequence with desired auto correlation and cross-correlation properties, which are superimposed at a low power level over the data sequence. The power level is such that the composite transmitted signal meets the spectral mask requirements of the system, while the power level and processing gain of the sequence enable the required performance enhancements. The PN sequence can be implemented as a number of variations of the payload data constellation, including but not limited to: (1) a subset of the constellation symbols; (2) a different constellation; (3) a different waveform; (4) different symbol rates; and (5) offset phase, time and frequency versions of the constellation.

A high-level block diagram of the communication system 200 covering multiple embodiments in accordance with a non-limiting example of the present invention is shown in FIG. 4. This communication system 200 transmits a pilot carrier that is a periodically repeating spread spectrum sequence. A transmitter section is shown at 202, which could be respective earth station linked by a satellite transponder (not shown) to a receiver section illustrated at 204 as a non-limiting example. Of course, any station can include both transmitter and receiver components, but the configuration is shown with one station as the transmitter site 202 and the other station as the receiver site 204.

It should also be understood that QPSK (Quadrature Phase Shift Keying) and variations of QPSK, such as DQPSK (differential) and m-aray PSK, are types of favored modulation technique for satellite communication systems because it transmits no separate, energy consuming, carrier reference. Its use of signal-to-noise ratio degrading non-linear components in a carrier regeneration process prevents successful carrier and phase recovery for a very low value of $(E_b/N_o)$, or less than 4 dB. This problem could be rendered more difficult by lower code rate codes, such as rate ⅓, which expand the bandwidth of the signal and reduce signal-to-noise ratio relative to higher rate codes.

QPSK, DQPSK and m-ary PSK are all forms of phase-shift keying (PSK) as a digital modulation scheme that conveys data by changing or modulating the phase of a reference signal as the carrier wave. A finite number of phases are used to represent the digital data and each phase is assigned a unique pattern of binary bits. Each phase could possibly encode an equal number of bits. Thus, each pattern of bits forms a symbol that is represented by the particular phase. A demodulator can determine a phase of a received signal and map it back to a symbol that represents and recovers original data.

Differences in successive phases are a type of DPSK. The constellation diagram is used to represent PSK schemes and refer to the in-phase and quadrature axes. The amplitude of a point along the in-phase axis can modulate a cosine (or sine) wave and amplitude along the quadrature axis can modulate a sine (or cosine) wave. Phase separation occurs when the constellation points are positioned with uniform angular spacing around the circle. Constellation points can be a power of two since the data conveyed is binary. With QPSK and four phases, two bits per symbol can be encoded with gray coding used to minimize the bit error rate (BER). Sometimes data can change rather than set the phase, such as in differential encoding.

At the transmitter site 202, a mixer/summer circuit 210 receives two signals from a first circuit chain that includes a Payload Data Generation circuit 212, Source Encoder 214, Channel Encoder 216, and Baseband Modulation circuit 218. The second circuit chain includes a PN Sequence Generator 220, Baseband Modulation circuit 222, Time/Frequency Operations circuit 224 and Signal Conditioning and Scaling circuit 226. After the mixing, the combined signal is sent to a Payload Signal Conditioning circuit 228 and Frequency Translation circuit 232 and transmitted through appropriate transmitter circuits (not shown) through Antenna 232 into the communications channel 234.

The signal is transmitted to the receiver 204 and received into its Antenna 240. Frequency Translation 242 occurs and the signal is forwarded to a Payload Signal Conditioning and Detection circuit 244. At the same time, the PN Sequence Generator 246 generates a PN sequence and a Spread Pilot Signal Initial Acquisition circuit 248 receives the signal from the PN Sequence Generator 246 and the signal from the Payload Signal Conditioning and Detection circuit 244. The Spread Pilot Signal Initial Acquisition circuit 248 forwards spread signal initial synchronization information to a Spread Pilot Signal Characteristic Extraction circuit 250, which also receives the post conditioned modulated signal from the Payload Signal Conditioning and Detection circuit 244. The Spread Pilot Signal Characteristic Extraction circuit 250 forwards signal tracking information to a Control Recovery Circuit 252 and Control Signal Distribution circuit 254.

The circuit 244 forwards its signal to a Payload Signal Frequency and Time Tracking circuit 256, which forwards the time and frequency synchronized modulated payload signal to a Baseband Demodulation circuit 258, a Channel Decoder 260, and Source Decoder 262, which then recovers the payload data.

In this diagram, the payload data signal processing elements such as blocks 228 and 244 of both the transmitter 202 and receiver 204 can be standard for various digital modulation formats. In accordance with a non-limiting example of the present invention, a continuously present, non-interfering pseudorandom symbol sequence is injected. This sequence is known at the receiver and enables the reliable extraction of control signals required for robust receiver performance.

To obtain this robust performance, a known sequence having random or pseudo random characteristics with predefined auto correlation and cross-correlation properties is identically generated at the transmitter 202 and receiver 204. Payload data as information symbols to be conveyed via the channel from the transmitter to the receiver, is encoded and modulated by standard techniques. The known sequence is superimposed on the payload signal is a non-interfering manner.

Different embodiments can use one or a combination of: (1) a subset of the constellation symbols; (2) a different constellation; (3) a different waveform; (4) different symbol rates; and (5) offset phase, time and frequency versions of the constellation. This known sequence can be thought of as a training sequence. Some systems use either a single training sequence or periodic training sequences embedded in the payload data, in accordance with a non-limiting example of the present invention, transmission of payload data is suspended during the presence of the training sequence and the training sequence is transmitted with characteristics which are the same as or a subset of those of the payload data.

In accordance with a non-limiting example of the present invention, the known pilot signal or "training sequence", is present either continuously, or with a high duty cycle. It does not interfere with the payload data to the extent that payload signal demodulation is appreciably degraded or to the extent that it can be removed from the composite received signal prior to payload demodulation. As a result, the presence of the known pilot signal does not compromise payload data throughput while also providing the advantages of a known sequence, primarily in tracking loops and other standard functional blocks where errors extracted from known data provides more robust performance than those estimated under the assumption of estimates from reasonable decisions.

As shown in the embodiment of FIG. 4, a known pseudo random number (PN) sequence is generated at the transmitter 202 at the PN Sequence Generator 220. The PN sequence is modulated by Baseband Modulator 222 in a form that provides an acceptable level of interference between itself and the payload signal, while providing a level of information that enhances overall receiver performance. "Enhanced performance" can be defined differently for different application spaces. The modulated known pilot signal is processed via a variety of application appropriate signal processing functions to reduce interference with the payload signal. Such processes can include but are not limited to a time offset, phase offset, or frequency offset such as at 224.

The known pilot signal is conditioned such as at 236. These techniques may include pulse shaping, filtering, sample rate conversion, frequency translation, and other methods suggested by those skilled in the art. The resulting waveform can be scaled and combined with the payload data symbols. The aggregate waveform is conditioned such as at 228 to force it into compliance with the requirements for transmission over a predefined RF channel. The conditioned, aggregate signal is translated to a final RF such as at 230 amplified and transmitted.

At the receiver 204 the aggregate waveform is received, conditioned and down converted to some IF such as at 242 and 244. In FIG. 4, it is assumed that the payload signal can be demodulated in the presence of the known pilot signal. In other embodiments, the known pilot signal may be extracted from the aggregate signal, leaving the payload signal, which is passed to a circuit chain that includes payload demodulation of the signal. The system demodulates the payload data using typically conventional circuits, such as at 258, with the exception that the payload demodulation circuit has an increased performance using information extracted from the known data demodulation signal processing circuits. The known, modulated pilot signal waveform is extracted from the aggregate waveform. Different techniques of extraction can be used. These techniques may include but are not limited to filtering, matched filtering, correlation, and other known techniques. If the known transmitted and received sequences are to be synchronized, which is the case in many embodiments, an initial acquisition of timing and frequency offset is performed. Techniques for initial acquisition are well known to those skilled in the art.

The extracted, received and known pilot signal is compared to the undistorted version of itself that is generated at the receiver, and various parameters extracted via this comparison. Such parameters may include, but are not limited to, the timing offset, timing drift, frequency offset, frequency offset drift, phase offset, multipath channel characteristics, and similar parameters. Typically, these parameters can be computed precisely because the transmitted pilot signal properties are known and not subject to decision or characterization errors. The extracted parameters can be appropriated to control loops and other processing paths within the payload processing circuit chain to enhance the error performance in the payload data demodulation process.

A non-limiting example is now set forth.

In one embodiment, the payload data is assumed to be coded with a convolutional FEC and is modulated in an "X" symbol per second QPSK format. The pilot signal can be assumed to be an X/100 symbol per second BPSK format with a 45 degree offset from one coordinate used by the QPSK waveform. The timing jitter constraint on the BPSK waveform can be assumed to be the same as that of the QPSK waveform. The BPSK signal is scaled by a factor of 0.1 and combined with the payload waveform before translation to RF and transmission.

The aggregate signal is received by the receiver, and because the BPSK component of the aggregate is 20 dB down from the QPSK component, the QPSK signal can be demodulated with no appreciable degradation due to the presence of the BPSK signal. Because the bandwidth of the EPSK signal is approximately 1/100 that of the QPSK signal, the bulk of the QPSK signal can be filtered from the aggregate signal before it is passed to the circuit chain used for pilot signal processing.

Further, because of the 45 degree phase offset between the two PSK signals, the effects of summing is further reduced. In one embodiment, the onset of the pilot signal can precede the onset of the payload signal, allowing pilot signal acquisition and demodulator initialization prior to any payload data onset. In another form of the embodiment, the two signals can commence simultaneously and the pilot signal extracted information aids parameter initialization. In yet another form of the embodiment, the onset of both signal components can be simultaneous and the payload signal can start with a known preamble to quickly initialize the required parameters while the pilot signal provides sustained accuracy for the duration of the transmission.

Once the aggregate signal is filtered, the receiver's PN sequence is synchronized with the received PN sequence of the pilot signal. PN synchronization techniques are known to those skilled in the art. In this embodiment, the pilot signal is over-sampled to provide parameter accuracies consistent to those required for the higher rate signal. Once the two sequences are synchronized, the difference information is extracted and processed using techniques known to those skilled in the art to provide information required for various demodulator functions. These include, but are not limited to, frequency tracking, symbol time tracking, phase offset tracking, and turbo decoder initialization. Variations of each of the above-described operations can also be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for communicating, comprising:
a transmitter comprising,
an encoder and baseband modulator that encodes and modulates a sequence of data symbols as a payload data constellation to be communicated;
a PN sequence generator and baseband modulator that forms a pilot signal as a training sequence with a periodically repeating spread spectrum sequence;
a circuit that superimposes the pilot signal over the sequence of data symbols to form a composite communications signal that is transmitted; and
a receiver that receives the composite communications signal and extracts the pilot signal from the composite communications signal.

2. The system according to claim 1, which further comprises a circuit that processes the pilot signal as variation of the payload data constellation.

3. The system according to claim 1, wherein said pilot signal comprises one of at least a subset of constellation symbols, different symbol rates, and offset phase, a different constellation, a different modulation, time and frequency versions of the payload data constellation.

4. The system according to claim 1, wherein said pilot signal comprises predefined auto correlation and cross-correlation properties.

5. The system according to claim 1, which further comprises a conditioning circuit that conditions the pilot signal by one of at least pulse shaping, filtering, sample rate conversion and frequency translation.

6. The system according to claim 1, wherein said encoder comprises a convolutional Forward Error Correction (FEC) encoder.

7. The system according to claim 1, wherein said baseband modulator for said sequence of data symbols comprises a Phase Shift Keying (PSK) modulator.

8. The system according to claim 1, which further comprises a PN sequence generator at the receiver that generates an undistorted version of the pilot signal generated at the transmitter, and a circuit that extracts processing parameters used in demodulating the payload data.

9. The system according to claim 8, wherein the processing parameters comprise at least one of timing offset, timing drift, frequency offset, frequency offset drift, phase offset, and multipath channel characteristics.

10. An apparatus for transmitting communications signals, comprising:
an encoder and baseband modulator that encodes and modulates a sequence of data symbols as a payload data constellation to be communicated;
a PN sequence generator and baseband modulator that forms a pilot signal as a training sequence with a periodically repeating spread spectrum sequence; and
a circuit that superimposes the pilot signal over the sequence of data symbols to form a composite communications signal that is transmitted.

11. The apparatus according to claim 10, which further comprises a circuit that processes the pilot signal as variation of the payload data constellation.

12. The apparatus according to claim 10, wherein said pilot signal comprises one of at least a subset of constellation symbols, different symbol rates, and offset phase, time and frequency versions of the payload data constellation.

13. The apparatus according to claim 10, wherein said pilot signal comprises predefined auto correlation and cross-correlation properties.

14. The apparatus according to claim 10, which further comprises a conditioning circuit that conditions the pilot signal by one of at least pulse shaping, filtering, sample rate conversion and frequency translation.

15. The apparatus according to claim 10, wherein said encoder comprises a convolutional Forward Error Correction (FEC) encoder.

16. The apparatus according to claim 10, wherein said baseband modulator for said sequence of data symbols comprises a Phase Shift Keying (PSK) modulator.

17. A method of communicating, which comprises:
encoding and baseband modulating within an encoder and baseband modulator circuit a sequence of data symbols as a payload data constellation to be communicated;
forming at a PN sequence generator and baseband modulator a pilot signal as a training sequence with a periodically repeating spread spectrum sequence; and
superimposing at a mixer circuit the pilot signal over the sequence of data symbols to form a composite communications signal.

18. The method according to claim 17, which further comprises forming the pilot signal as a variation of the payload data constellation.

19. The method according to claim 17, which further comprises forming the pilot signal as one of a subset of constellation symbols, different symbol rates, and offset phase, time and frequency versions of the payload data constellation.

20. The method according to claim 17, which further comprises forming the pilot signal with predefined auto correlation and cross-correlation properties.

21. The method according to claim 17, which further comprises suspending any transmission of payload data during the presence of the pilot signal as a training sequence.

22. The method according to claim 17, which further comprises conditioning the pilot signal by one of at least pulse shaping, filtering, sample rate conversion and frequency translation.

23. The method according to claim 17, which further comprises encoding the sequence of data symbols with a convolutional Forward Error Correction (FEC) code.

24. The method according to claim 17, which further comprises baseband modulating the sequence of data symbols in a Phase Shift Keying (PSK) format.

25. The method according to claim 17, which further comprises receiving composite communications signal within a receiver and extracting the pilot signal from the composite communications signal.

26. The method according to claim 25, which further comprises comparing the extracted pilot signal with an undistorted version of the pilot signal that has been generated at the receiver to extract processing parameters used in demodulating the payload data.

27. The method according to claim 25, which further comprises extracting processing parameters that include at least one of timing offset, timing drift, frequency offset, frequency offset drift, phase offset, and multipath channel characteristics.

\* \* \* \* \*